Figure 2:
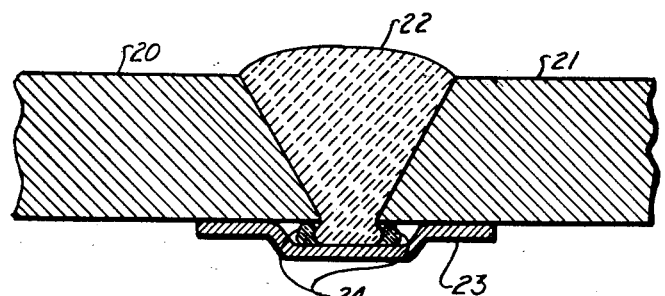

March 20, 1945. J. O. JACKSON 2,371,823

METHOD OF MAKING WELDED JOINTS

Filed Jan. 16, 1942

INVENTOR
James O. Jackson
BY
Richard O. Marine
ATTORNEY

Patented Mar. 20, 1945

2,371,823

UNITED STATES PATENT OFFICE 2,371,823

METHOD OF MAKING WELDED JOINTS

James O. Jackson, Crafton, Pa., assignor to Pittsburgh-Des Moines Company, Pittsburgh, Pa., a corporation of Pennsylvania Application January 16, 1942, Serial No. 427,069

7 Claims. (Cl. 219—10)

This invention relates to a method of making electric arc fusion welds with welding rods which have been coated with a fusible covering which melts from the heat of the arc and protects the molten metal deposited from harmful absorptions from the atmosphere.

This invention relates particularly to welds made from only one side of the pieces being joined where it is desired that the weld have the greatest possible strength and resistance to bending and impact.

It has heretofore been the practice in making welds of the character indicated to prepare the edges to be welded by beveling them by planing, chipping, flame cutting or the like to a suitable angle. If the pieces are very thick they must be spaced apart somewhat to permit the weld to penetrate through to the bottom surface. There is, however, a tendency for the arc to burn off the sharp corners, or root edges, at the lower surface permitting the molten metal to drop through. To prevent this a backing up strip may be placed under the pieces being welded so that the molten weld metal falls on the backing up strip and usually partially melts it. If the angle of bevel and the spacing of the root edges are properly chosen the pieces may be welded together with uncoated welding rods and reasonably sound welds secured, but uncoated rods do not produce as ductile and desirable welds as rods which have been coated. However, if coated rods are used with the customary backing up strips slag pockets are formed in the lower regions of the weld, resulting in lack of complete penetration of the welding metal to the root edges of the weld and greatly weakening the welded joint. If mandrels are employed in lieu of backing up strips further disadvantages arise. It is particularly difficult to use them on many kinds of work such as large field welded tanks, first, because of the fact that the weld adheres strongly to the mandrel and is very difficult and costly to remove, its removal resulting in greatly weakening the joint and injury to the mandrel and weld, and, second, because the mandrels, being necessarily large, heavy and cumbersome, are very difficult to use in large field welded structures, especially where the welding is done in the vertical or overhead position.

It is the purpose of my invention to make it not only possible but very easy to produce full strength welds from one side of the pieces to be joined using coated rods without any of the difficulties and defects previously described.

This I accomplish by providing a novel form of backing-up strip which is thin, relatively inexpensive, which aids in fitting up and aligning the edges of the plates to be welded, and causes the removal of slag from the entire region of the weld, even permitting flow of the welding metal around the corners, or root edges, at the lower surface, which serves to anchor the weld. The strip being relatively inexpensive is preferably left in place and serves to further greatly re-inforce the welded joint where removal of a mandrel or other backing would greatly weaken it.

Figure 1:
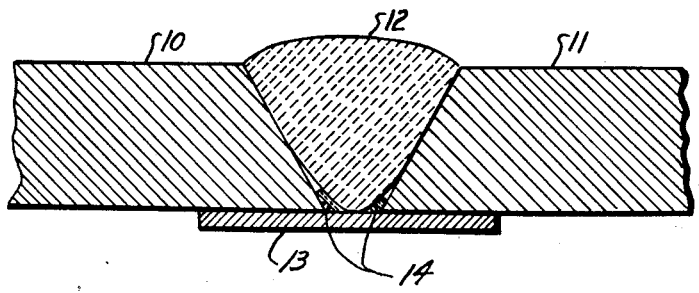

In the accompanying drawing showing for purpose of exemplification, but without limiting my invention or claims thereto, one form of my invention:

Figure 1 is a diagrammatic cross sectional view of two pieces of steel plate welded together with weld metal and provided with a flat backing-up strip on the lower surface illustrating the defects of such arrangement, and Figure 2 is a diagrammatic cross sectional view of a similar arrangement modified in accordance with the principles of my invention, whereby the defects of the system of Fig. 1 are obviated.

In Figure 1 plates 10 and 11 are welded together from the upper side by coated rods depositing weld metal 12 between plates 10 and 11 and against the conventional backing up strip 13. A part of the molten rod coating or slag 14 is trapped at the root of the weld because of the surface tension of the molten metal causing it to draw in from the sharp corners, or root edges, of plates 10 and 11. This deposit of slag weakens the welded joint particularly when it is bent so that the root of the weld is in tension because the unwelded surfaces have a notch effect causing an intensification of stress along the notches encouraging the starting of cracks and greatly reducing the resistance of the joint to impact.

In Figure 2 the backing up strip 23 instead of being flat is bent or machined or otherwise prepared so as to present a portion adjacent to the weld root which portion is spaced away from the lower surfaces of the pieces 20 and 21. It is not essential that any portion of the backing up strip 23 touch the lower surfaces of pieces 20 and 21 but it is usually convenient to have at least the edges touch such surfaces so that they may be tack welded to such surfaces and so to assist in their support and alignment. Now when weld metal 22 is deposited from coated welding rods at the root faces of the weld a portion of the molten coating or slag which, were it not for the space between the backing up strip 23 and plates 20 and 21, would be trapped and cause defects in the form of slag inclusions is forced by the molten deposited metal into the outer portions of such space with the result that the deposited weld metal recedes somewhat into the inner portion of said space causing it to fuse smoothly with the sharp corners, or root edges, of plates 20 and 21, and, preferably, partially surrounds the same, and the corners may be partially melted away, all with the result that no notch or depression occurs but rather a reinforcement of the joint on its under side and a maximum of strength of the weld in bending or impact is obtained.

As an example further disclosing my invention I have failed to obtain satisfactory welds in steel plates ½" in thickness containing about 3½% nickel welded with coated 25% chromium 20% nickel welding rods welding from one side against flat backing up strips such welds failing to pass the "root bend" test as specified by the "Standard Qualification Procedure" of the American Welding Society. With my notched backing up strip using strips three sixteenth of an inch thick with the notch about ⅛" deep and about ½" wide welds could easily be made which would consistently pass the above standard test. This made possible the welding of large structures not before possible.

I claim:

1. The method of producing a welded joint between the root faces of the adjacent edges of steel plates, assembled with their root edges slightly spaced apart, in which the welding operation is performed from only one side of said plates and in downhand, overhead or intermediate welding positions, said method consisting of: positioning a back-up member adjacent said root edges, said member having a portion spaced away from said root edges, the space so formed extending laterally beyond both said root edges; fusing metal from a metallic electrode, coated with a slag producing substance, with said root faces by means of an electric arc maintained between said electrode and said root faces, said fusing extending to, and around the root edges and causing any molten slag adhering to and around said root edges to recede into the space between said member and said root edges and away from said root edges.

2. The method as defined in claim 1 in which the upper portions of adjacent plate edges are removed to form a wider opening toward the side from which the welding is to be performed.

3. The method as defined in claim 1 in which the remainder of the space between said adjacent plate edges is filled with weld metal.

4. The method as defined in claim 1 in which said back-up member is attached to one of said plates before performing said method.

5. The method as defined in claim 1 in which said plates contain nickel and the said electrodes contain chromium and nickel in significant quantities.

6. The method as defined in claim 1, in which the steel plates contain approximately 3½% nickel and the metal electrode contains approximately 25% chromium and 20% nickel.

7. The method of producing a welded joint between the adjacent edges of steel plates assembled with said edges spaced slightly apart in which the welding operation is performed from only one face of said plates and in downhand, overhead or intermediate welding positions, said method consisting of: positioning a back-up member adjacent the face opposite that from which the welding is to be performed, said member having a portion spaced away from said opposite face, the space so formed extending laterally beyond both of the adjacent plate corners; fusing metal, from a metallic electrode coated with a slag producing substance, with the faces of said plate edges, adjacent said corners, by means of an electric arc maintained between said electrode and said adjacent faces, the fusing extending to and around the said corners, and causing any molten slag adhering to said adjacent faces and around said corners to recede into the space between said member and said opposite face and away from said corners and finishing the joint by filling the remaining space between the said adjacent edges with weld metal.

JAMES O. JACKSON.